United States Patent
Kim et al.

(10) Patent No.: US 10,625,563 B2
(45) Date of Patent: Apr. 21, 2020

(54) HEAT PUMP SYSTEM FOR VEHICLE

(71) Applicant: Hyundai Motor Company, Seoul (KR)

(72) Inventors: Jae Yeon Kim, Hwaseong-si (KR); Yunho Hwang, Ellicott City, MD (US)

(73) Assignee: Hyundai Motor Company, Seoul (KR)

( * ) Notice: Subject to any disclaimer, the term of this patent is extended or adjusted under 35 U.S.C. 154(b) by 600 days.

(21) Appl. No.: 15/369,203

(22) Filed: Dec. 5, 2016

(65) Prior Publication Data

US 2018/0117984 A1     May 3, 2018

(30) Foreign Application Priority Data

Nov. 1, 2016   (KR) ........................ 10-2016-0144496

(51) Int. Cl.
*B60H 1/00*     (2006.01)
*B60L 58/26*    (2019.01)

(52) U.S. Cl.
CPC ..... *B60H 1/00278* (2013.01); *B60H 1/00392* (2013.01); *B60H 1/00885* (2013.01);
(Continued)

(58) Field of Classification Search
CPC ............ B60H 1/00392; B60H 1/00278; B60H 1/00885; B60H 2001/00307;
(Continued)

(56) References Cited

U.S. PATENT DOCUMENTS 6,209,331 B1 *  4/2001  Lake ................. B60H 1/00278
                                                              62/180
6,230,508 B1    5/2001  Baker et al.
(Continued)

FOREIGN PATENT DOCUMENTS

JP      5440426 B2      3/2014
JP    2015186989 A     10/2015
(Continued)

OTHER PUBLICATIONS

Hwang, Y. et al., "Experimental Cooling and Energy Performance of Motor Vehicle AC Using HFC-152A," Center for Environmental Energy Engineering, SAE International, Paper # 15TMSS-0042, 25 pages.

(Continued)

*Primary Examiner* — Frantz F Jules
*Assistant Examiner* — Martha Tadesse
(74) *Attorney, Agent, or Firm* — Slater Matsil, LLP

(57) ABSTRACT

A heat pump system can be used with a vehicle. A cooling system includes a radiator connected to a cooling line and a first water pump and circulating a coolant along the cooling line so as to cool an electric component. A battery module is provided on a battery cooling line selectively connected to the cooling line through a first valve. And HVAC module includes an internal heater connected to the cooling line through a first connection line, a cooler connected to the battery cooling line through a second connection line, and an opening or closing door provided between the internal heater and the cooler and controlling external air passing through the cooler to be selectively introduced into the internal heater depending on cooling, heating, and heating and dehumidifying modes of the vehicle. A centralized energy is connected to each of the battery cooling line and the cooling line.

19 Claims, 6 Drawing Sheets

(52) U.S. Cl.
CPC .......... *B60H 1/00899* (2013.01); *B60L 58/26* (2019.02); *B60H 2001/00307* (2013.01); *B60H 2001/00928* (2013.01); *B60Y 2200/91* (2013.01); *B60Y 2306/05* (2013.01); *B60Y 2306/07* (2013.01); *B60Y 2400/112* (2013.01); *B60Y 2400/88* (2013.01); *Y02T 10/705* (2013.01); *Y02T 10/7005* (2013.01)

(58) Field of Classification Search
CPC .......... B60H 2001/00928; B60H 1/143; B60L 58/26; B60Y 2400/112; B60Y 2306/07; B60Y 2200/91; B60Y 2400/88; B60Y 2306/05; F25B 2600/2519
See application file for complete search history.

(56) References Cited

U.S. PATENT DOCUMENTS

| | | | |
|---|---|---|---|
| 8,517,087 B2 | 8/2013 | Zeigler et al. | |
| 8,899,062 B2 | 12/2014 | Kadle et al. | |
| 9,109,840 B2 | 8/2015 | Kadle et al. | |
| 9,239,193 B2 | 1/2016 | Kadle et al. | |
| 9,376,031 B2 * | 6/2016 | Williams | B60L 11/187 |
| 2004/0089014 A1 * | 5/2004 | Amaral | B60H 1/00907 62/324.1 |
| 2005/0178523 A1 * | 8/2005 | Itoh | B60H 1/00385 165/42 |
| 2011/0174000 A1 * | 7/2011 | Richter | B60H 1/00064 62/93 |
| 2011/0296855 A1 * | 12/2011 | Johnston | B60L 3/0046 62/79 |
| 2012/0153718 A1 * | 6/2012 | Rawlinson | H02K 5/20 307/10.1 |
| 2012/0222846 A1 * | 9/2012 | Kadle | F28D 9/005 165/166 |
| 2013/0283838 A1 | 10/2013 | Kadle et al. | |
| 2014/0102126 A1 * | 4/2014 | Aoun | B60H 1/00899 62/244 |
| 2014/0298838 A1 * | 10/2014 | Morishita | B60H 1/321 62/151 |
| 2015/0013367 A1 * | 1/2015 | Carpenter | B60H 1/00278 62/222 |
| 2015/0202986 A1 * | 7/2015 | Hatakeyama | B60H 1/22 165/287 |
| 2016/0023537 A1 * | 1/2016 | Kim | B60H 1/00885 62/243 |
| 2016/0107507 A1 * | 4/2016 | Johnston | B60H 1/00278 62/160 |
| 2016/0107508 A1 * | 4/2016 | Johnston | B60H 1/00278 165/202 |
| 2016/0159204 A1 * | 6/2016 | Katoh | B60H 1/3211 62/185 |
| 2016/0339767 A1 * | 11/2016 | Enomoto | B60H 1/00785 |
| 2017/0008373 A1 * | 1/2017 | Makihara | B60K 11/02 |
| 2017/0021698 A1 * | 1/2017 | Hatakeyama | F25B 7/00 |
| 2017/0197490 A1 * | 7/2017 | Enomoto | B60H 1/00899 |

FOREIGN PATENT DOCUMENTS

| | | |
|---|---|---|
| KR | 1020120014621 A | 2/2012 |
| KR | 1020150093590 A | 8/2015 |

OTHER PUBLICATIONS

Peng, Q. et al., "Progess in Heat Pump Air Conditioning Systems for Electric Vehicles—A Review," Energies 2016, 9 (4), 240, Mar. 25, 2016, 17 pages.

Wang, K. et al., "Review of secondary loop refrigeration systems," International Journal of Refrigeration, vol. 33, Oct. 13, 2009, pp. 212-234.

Weissler, P., "Secondary loop and heat pump climate control under evaluation once more," SAE International, Automotive Engineering Article, Dec. 9, 2015, 2 pages.

* cited by examiner

HEAT PUMP SYSTEM FOR VEHICLE

CROSS-REFERENCE TO RELATED APPLICATIONS

This application claims priority to and the benefit of Korean Patent Application No. 10-2016-0144496 filed in the Korean Intellectual Property Office on Nov. 1, 2016, the entire contents of which are incorporated herein by reference.

TECHNICAL FIELD

The present invention relates to a heat pump system for a vehicle.

BACKGROUND

Generally, an air conditioner for a vehicle includes a means for circulating a refrigerant in order to heat or cool an interior of the vehicle.

The air conditioner, which is to maintain the interior of the vehicle at an appropriate temperature regardless of a change in an external temperature to maintain a comfortable interior environment, is configured to heat or cool the interior of the vehicle by heat exchange by an evaporator in a process in which a refrigerant discharged by driving of a compressor is circulated to the compressor through a condenser, a receiver drier, an expansion valve, and the evaporator.

That is, the air conditioner lowers a temperature and a humidity of the interior by condensing a high-temperature high-pressure gas-phase refrigerant compressed from the compressor by the condenser, passing the refrigerant through the receiver drier and the expansion valve, and then evaporating the refrigerant in the evaporator in a cooling mode in summer.

Meanwhile, recently, in accordance with a continuous increase in an interest in energy efficiency and an environmental pollution problem, the development of an environmentally-friendly vehicle capable of substantially substituting for an internal combustion engine vehicle has been demanded, and the environmentally-friendly vehicle is generally classified into an electric vehicle driven using an fuel cell or electricity as a power source and a hybrid vehicle driven using an engine and a battery.

In the electric vehicle or the hybrid vehicle among these environmentally-friendly vehicles, a separate heater is not used unlike an air conditioner of a general vehicle, and an air conditioner used in the environmentally-friendly vehicle is generally called a heat pump system.

Meanwhile, the electric vehicle generates driving force by converting chemical reaction energy between oxygen and hydrogen into electric energy. In this process, heat energy is generated by a chemical reaction in a fuel cell. Therefore, it is necessary in securing performance of the fuel cell to effectively remove generated heat.

In addition, the hybrid vehicle generates driving force by driving a motor using electricity supplied from the fuel cell described above or an electrical battery, together with an engine operated by a general fuel. Therefore, heat generated from the fuel cell or the battery and the motor should be effectively removed in order to secure performance of the motor.

Therefore, in the hybrid vehicle or the electric vehicle according to the related art, a cooling system, a heat pump system, and a battery cooling system should be configured using separate closed circuits, respectively, so as to prevent heat generation of the motor, an electric component, and the battery including the fuel cells.

Therefore, a size and a weight of a cooling module disposed at the front of the vehicle are increased, and a layout of connection pipes supplying a refrigerant or a coolant to each of the heat pump system, the cooling system, and the battery cooling system in an engine compartment becomes complicated.

In addition, since the battery cooling system warming up or cooling the battery depending on a state of the vehicle is separately provided so that the battery exhibits optimal performance, a plurality of valves for connecting the respective connection pipes to each other are used, and noise and vibrations due to frequent opening or closing operations of these valves are transferred to the interior of the vehicle, such that a ride comfort is deteriorated.

The above information disclosed in this Background section is only for enhancement of understanding of the background of the invention and therefore it may contain information that does not form the prior art that is already known in this country to a person of ordinary skill in the art.

SUMMARY

The present invention relates to a heat pump system for a vehicle. In particular embodiments, the present invention relates to a heat pump system for a vehicle capable of cooling and heating an interior of the vehicle selectively using a high-temperature coolant and a low-temperature coolant.

Embodiments of the present invention provide a heat pump system for a vehicle having advantages of selectively exchanging thermal energy generated from a refrigerant at the time of condensing and evaporating the refrigerant with heat of a coolant and controlling an interior temperature of the vehicle using a low-temperature coolant or a high-temperature coolant of which the heat is exchanged.

Further embodiments of the invention provide a heat pump system for a vehicle having advantages of improving heating efficiency of the vehicle using waste heat of an electric component and a battery module and increasing an entire travel distance of the vehicle by efficiently controlling a temperature of the battery module so that the battery module exhibits optimal performance.

An exemplary embodiment of the present invention provides a heat pump system for a vehicle, including: a cooling system including a radiator connected to a cooling line and a first water pump and circulating a coolant along the cooling line so as to cool an electric component; a battery module provided on a battery cooling line selectively connected to the cooling line through a first valve; a heating, ventilation, and air conditioning (HVAC) module including an internal heater connected to the cooling line through a first connection line, a cooler connected to the battery cooling line through a second connection line, and an opening or closing door provided between the internal heater and the cooler and controlling external air passing through the cooler to be selectively introduced into the internal heater depending on cooling, heating, and heating and dehumidifying modes of the vehicle; and a centralized energy (CE) module connected to each of the battery cooling line and the cooling line, exchanging thermal energy generated at the time of condensing and evaporating a refrigerant circulated therein with heat of a coolant, and supplying a low-temperature or high-temperature coolant of which the heat is exchanged to the HVAC module.

The CE module may include: a condenser provided on the cooling lines connected to each other through a second valve provided on the cooling line between the radiator and the battery module and a third valve provided on the cooling line between the electric component and the first valve; an expansion valve connected to the condenser through a refrigerant line; an evaporator connected to the expansion valve through the refrigerant line and provided on the battery cooling line between the battery module and the first valve; and a compressor provided on the refrigerant line between the evaporator and the condenser.

The first valve may connect the cooling line connected to the electric component and the battery cooling line to each other between the radiator and the evaporator, and the first connection line may selectively connect the cooling line and the internal heater to each other through the second valve and the third valve.

A first branch line connecting the evaporator and the battery module to each other through the first valve may be provided on the battery cooling line, the second connection line may be connected to the battery cooling line through a fourth valve between the evaporator and the battery module connected to each other through the first branch line, and a second branch line connected to the cooling line between the radiator and the first water pump through a fifth valve may be provided on the cooling line connecting between the electric component and the radiator.

A reservoir tank connected to the second branch line may be provided between the radiator and the first water pump.

In the case of cooling the electric component in the cooling mode of the vehicle, the first branch line may be opened through an operation of the first valve and the second connection line may be opened in a state in which the battery cooling line connected to the battery module is closed through an operation of the fourth valve, the first connection line may be closed and the cooling line connecting the electric component and the condenser to each other may be opened, through operations of the second and third valves, the connection between the cooling line and the battery cooling line may be closed through operations of the first to third valves, the cooling line connecting the electric component and the radiator to each other may be opened in a state in which the second branch line is closed through an operation of the fifth valve, and the refrigerant may be circulated in the CE module.

The evaporator may exchange heat between a coolant circulated along the battery cooling line and a low-temperature refrigerant evaporated therein and supply a low-temperature coolant to the cooler, in the cooling mode of the vehicle.

In the case of cooing the battery module together with the electric component in the cooling mode of the vehicle, the battery cooling line connected to the battery module may be opened through an operation of the fourth valve.

In the case of recovering waste heat of the battery module and the electric component in the heating mode of the vehicle, the first branch line may be closed through an operation of the first valve and the second connection line may be closed in a state in which the battery cooling line connected to the battery module is opened through an operation of the fourth valve, the cooling line connecting the electric component and the condenser to each other and the first connection line may be opened through operations of the second and third valves, the cooling line may be connected to the battery cooling line through operations of the first to third valves, the cooling line connecting the electric component and the radiator to each other may be closed in a state in which the second branch line is opened through an operation of the fifth valve, and the refrigerant may be circulated in the CE module.

The waste heat generated in the electric component and the battery module may raise a temperature of a coolant circulated along the cooling line and the battery cooling line, and the coolant of which the temperature is raised may raise a temperature of a refrigerant exhausted from the evaporator.

In the case of recovering the waste heat from only the battery module in the heating mode of the vehicle, the first branch line may be opened through an operation of the first valve, and the connection between the cooling line and the battery cooling line may be closed through operations of the first to third valves.

In the heating and dehumidifying mode of the vehicle, the first branch line may be opened through an operation of the first valve and the second connection line may be opened in a state in which the battery cooling line connected to the battery module is closed through an operation of the fourth valve, the cooling line connecting the electric component and the condenser to each other and the first connection line may be opened through operations of the second and third valves, the connection between the cooling line and the battery cooling line may be closed through operations of the first to third valves in a state in which an operation of the first water pump is stopped, and the refrigerant may be circulated in the CE module.

The condenser and the evaporator may be formed of a water cooling type heat exchanger into which a coolant is introduced through the cooling line and the battery cooling line.

The condenser may further include a receiver drier, and a refrigerant heater may be provided on the refrigerant line between the compressor and the evaporator.

On the refrigerant line between the compressor and the evaporator, each of an accumulator and a refrigerant heater may be provided.

A heater may be provided on the battery cooling line between the battery module and the evaporator, and the heater may be selectively turned on to heat a coolant circulated along the battery cooling line and introduce the heated coolant into the battery module.

In the case of raising a temperature of the battery module, the circulation of the refrigerant in the CE module may be stopped, and the first branch line may be connected to the battery cooling line and the connection between the battery cooling line and the cooling line may be closed, through an operation of the first valve.

A second water pump may be provided on the battery cooling line, and a third water pump may be provided on the first connection line.

The refrigerant circulated in the CE module may be an R152-a or R744 refrigerant.

The electric component may include a motor, an electric power control unit (EPCU), and an on-board charger (OBC), and the motor and the electric power control unit may generate heat while being driven and the on-board charger may generate heat in the case of charging the battery module.

As described above, according to the heat pump system for a vehicle according to an exemplary embodiment of the present invention, the thermal energy generated from the refrigerant at the time of condensing and evaporating the refrigerant is exchanged with the heat of the coolant, and an interior temperature of the vehicle is controlled using the low-temperature or high-temperature coolant of which the heat is exchanged, thereby making it possible to simplify the heat pump system for a vehicle and simplify a layout of connection pipes through which the refrigerant is circulated.

In addition, the heat pump system for a vehicle may improve heating efficiency of the vehicle using the waste heat of the electric component and the battery module, and may increase an entire travel distance of the vehicle by efficiently controlling the temperature of the battery module so that the battery module exhibits optimal performance.

In addition, the CE module generating the thermal energy through the condensation and evaporation of the refrigerant is packaged, and the high-performance R152-a or R744 refrigerant is used, such that a size and a weight may be reduced, and generation of noise, vibrations, and operation instability may be prevented as compared with an air conditioner according to the related art.

Further, the entire heat pump system for a vehicle is simplified, thereby making it possible to reduce a cost required for manufacturing the heat pump system for a vehicle and a weight of the heat pump system for a vehicle and improve space utilization.

Figure 1:
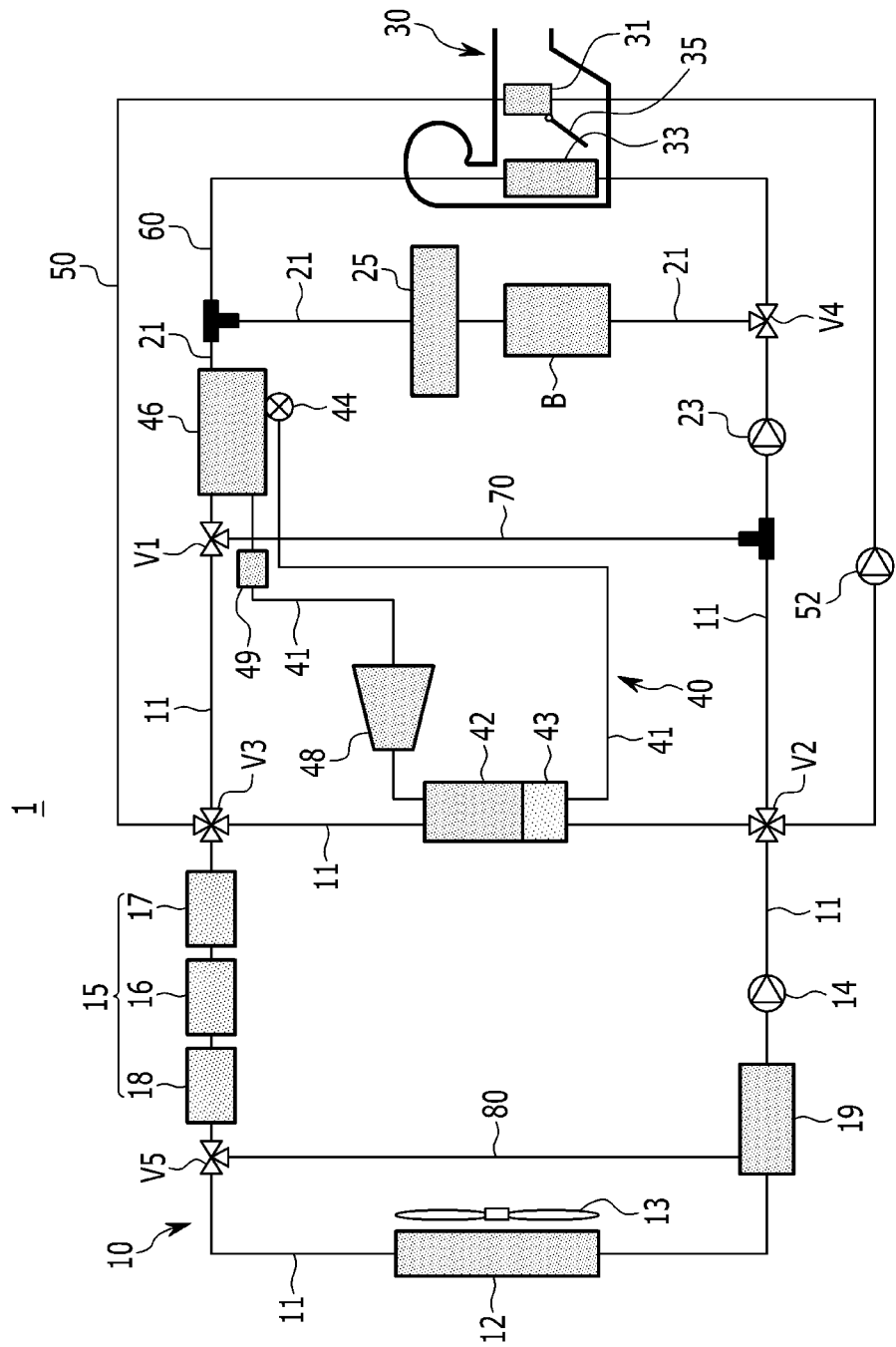
FIG. 1 is a block diagram of a heat pump system for a vehicle according to an exemplary embodiment of the present invention.

The following reference numerals can be used in conjunction with the drawings:

10: cooling system
11: cooling line
12: radiator
13: cooling fan
14: first water pump
15: electric component
19: reservoir tank
21: battery cooling line
23: second water pump
25: heater
30: HVAC module
31: internal heater
33: cooler
35: opening or closing door
40: CE module
41: refrigerant line
42: condenser
44: expansion valve
46: evaporator
48: compressor
50: first connection line
60: second connection line
70: first branch line
80: second branch line
B: battery module
V1, V2, V3, V4, V5: first, second, third, fourth and fifth valves

DETAILED DESCRIPTION OF ILLUSTRATIVE EMBODIMENTS

An exemplary embodiment of the present invention will hereinafter be described in detail with reference to the accompanying drawings.

Since exemplary embodiments stated in the present specification and configurations shown in the accompanying drawings are only exemplary embodiments of the present invention and do not represent the spirit of the present invention. Therefore, it is to be understood that various equivalents and modifications that may replace exemplary embodiments stated in the present specification and configurations shown in the accompanying drawings in a point in time at which the present invention is filed.

A description for contents that are not associated with the present invention will be omitted in order to clearly describe the present invention, and like reference numerals designate like elements throughout the specification.

Since sizes and thicknesses of the respective components were arbitrarily shown in the accompanying drawings for convenience of explanation, the present invention is not limited to contents shown in the accompanying drawings. In addition, thicknesses were exaggerated in order to obviously represent several portions and regions.

In addition, throughout the present specification, unless explicitly described to the contrary, the word "comprise" and variations such as "comprises" or "comprising" will be understood to imply the inclusion of stated elements but not the exclusion of any other elements.

In addition, the terms "~unit", "~means", "~part", "member", and the like, described in the specification mean units of a comprehensive configuration for performing at least one function or operation.

FIG. 1 is a block diagram of a heat pump system for a vehicle according to an exemplary embodiment of the present invention.

The heat pump system 1 for a vehicle according to an exemplary embodiment of the present invention exchanges thermal energy generated in a refrigerant at the time of condensing and evaporating the refrigerant with heat of a coolant to perform a cooling or heating mode of the vehicle only using a low-temperature or high-temperature coolant.

The heat pump system 1 for a vehicle is used in an electric vehicle. Referring to FIG. 1, the heat pump system 1 for a vehicle includes a cooling system 10, a battery module B, a heating, ventilation, and air conditioning (HVAC) module 30, and a centralized energy (CE) module 40.

First, the cooling system lo includes a radiator 12 connected to cooling lines 11 and a first water pump 14, and circulates a coolant along the cooling lines 11 so as to cool an electric component 15.

Here, the electric component 15 may include a motor 16 and an electric power control unit (EPCU) 17 and an on-board charger (OBC) 18 disposed at both sides of the motor 16.

The motor 16 and the electric power control unit 17 may generate heat while being driven, and the on-board charger 18 may generate heat in the case of charging the battery module B.

Therefore, in the case of recovering waste heat from the electric component 15 in the heating mode of the vehicle, the heat generated from the motor 16 and the electric power control unit 17 is recovered, and the heat generated from the on-board charger 18 may be recovered at the time of charging the battery module B.

The radiator 12 is disposed at the front of the vehicle, and has a cooling fan 13 disposed therebehind to cool the coolant through an operation of the cooling fan 13 and heat-exchange with external air.

The cooling system lo configured as described above circulates the coolant cooled in the radiator 12 along the cooling lines 11 through an operation of the first water pump 14 to cool the electric component 15 so as not to be overheated.

The battery module B is provided on a battery cooling line 21 selectively connected to the cooling line 11 through a first valve V1.

The battery module B supplies power to the electric component, and is a water cooling type battery module cooled by a coolant flowing along the battery cooling line 21. Here, a second water pump 23 is provided on the battery cooling line 21.

The second water pump 23 is provided on the battery cooling line 21 between the radiator 12 and the battery module B. The second water pump 23 is operated to circulate the coolant through the battery cooling lines 21.

That is, the battery module B is connected to the cooling system 10 through the battery cooling lines 101, and the coolant may be circulated in the battery module B through an operation of the second water pump 23.

In the present exemplary embodiment, the HVAC module 30 includes an internal heater 31, a cooler 33, and an opening or closing door 35.

The internal heater 31 is connected to the cooling line 11 through a first connection line 50. The cooler 33 is connected to the battery cooling line 21 through a second connection line 60.

In addition, the opening or closing door 35 is provided between the internal heater 31 and the cooler 33. The opening or closing door 35 controls external air passing through the cooler 33 to be selectively introduced into the internal heater 31 depending on cooling, heating, and heating and dehumidifying modes of the vehicle.

That is, in the heating mode of the vehicle, the opening or closing door 35 is opened so that the external air passing through the cooler 33 is introduced into the internal heater 31. To the contrary, in the cooling mode of the vehicle, the opening or closing door 35 closes the internal heater 31 so that the external air cooled while passing through the cooler 33 is directly introduced into an interior of the vehicle.

The CE module 40 is connected to each of the cooling line 11 and the battery cooling line 21. The CE module 40 exchanges thermal energy generated at the time of condensing and evaporating a refrigerant circulated therein with heat of a coolant, and supplies a low-temperature or high-temperature coolant of which the heat is exchanged to the HVAC module 30.

Here, the refrigerant is a high-performance R152-a or R744 refrigerant.

That is, the high-temperature coolant is supplied to the internal heater 31 through the first connection line 50, and the low-temperature coolant is supplied to the cooler 33 through the second connection line 60.

Here, the CE module 40 includes a condenser 42, an expansion valve 44, an evaporator 46, and a compressor 48 connected to one another through a refrigerant line 41.

First, the condenser 42 is provided on the cooling lines 11 connected to each other through a second valve V2 provided on the cooling line 11 between the radiator 12 and the battery module B and a third valve V3 provided on the cooling line 11 between the electric component 15 and the first valve V1.

The condenser 42 exchanges heat between a refrigerant introduced thereinto and a coolant to condense the refrigerant, and supplies thermal energy generated at the time of condensing the refrigerant to the coolant to raise a temperature of the coolant.

The expansion valve 44 is connected to the condenser 42 through the refrigerant line 41. The expansion valve 44 receives and expands the refrigerant passing through the condenser 42.

The expansion valve 44 may be a mechanical expansion valve or an electronic expansion valve.

The evaporator 46 is connected to the expansion valve 44 through the refrigerant line 21. The evaporator 46 is provided on the battery cooling line 21 between the battery module B and the first valve V1.

The evaporator 46 exchanges heat between a refrigerant introduced thereinto and a coolant to evaporate the refrigerant, and supplies low-temperature thermal energy generated at the time of evaporating the refrigerant to the coolant to lower a temperature of the coolant.

Here, the condenser 42 and the evaporator 46 may be formed of a water cooling type heat exchanger into which a coolant is introduced through the cooling line 11 and the battery cooling line 21.

In addition, the compressor 48 is provided on the refrigerant line 41 between the evaporator 46 and the condenser 42. The compressor 48 compresses a gaseous refrigerant exhausted from the evaporator 46.

Here, the condenser 42 may further include a receiver drier 43. In the present exemplary embodiment, the receiver drier 43 is configured integrally with the condenser 42. In addition, a refrigerant heater 49 may be provided on the refrigerant line 21 between the compressor 48 and the evaporator 46.

The refrigerant heater 49 heats the refrigerant and supplies the heated refrigerant to the compressor 48 to further raise a temperature of the coolant through a rise in a temperature of the refrigerant, thereby making it possible to promote heating performance improvement.

Here, the first valve V1 connects the cooling line 11 connected to the electric component 15 and the battery cooling line 21 to each other between the radiator 12 and the evaporator 46.

In addition, the first connection line 50 selectively connects the cooling line 11 and the internal heater 31 to each other through the second valve V2 and the third valve V3.

Here, a third water pump 52 may be provided on the first connection line 50. The third water pump 52 circulates the coolant through the first connection line 50.

Meanwhile, the first, second and third water pumps 14, 23, and 52 may be an electric water pump.

That is, the high-temperature coolant of which the temperature is raised while passing through the condenser 42 is introduced into the internal heater 31 through the first connection line 50 opened through the second and third valves V2 and V3.

Meanwhile, in the present exemplary embodiment, a first branch line 70 connecting the evaporator 46 and the battery module B through the first valve V1 is provided on the battery cooling line 21.

The first valve V1 selectively connects the cooling line 11 and the battery cooling line 21 to each other or selectively connects the battery cooling line 21 and the first branch line 70 to each other to control a flow of the coolant.

That is, the first valve V1 may connect the cooling line 11 connected to the radiator 12 and the battery cooling line 21 to each other and close the first branch line 70, in the case of cooling the battery module B using the coolant cooled in the radiator 12.

In addition, the first valve V1 may open the first branch line 70 and close connection between the cooling line 11 and the battery cooling line 21, in the case of raising a temperature of the battery module B or in the case of cooling the battery module B using the coolant exchanging the heat with the refrigerant.

Therefore, the low-temperature coolant of which the heat exchange with the refrigerant is completed in the evaporator 46 is introduced into the battery module B through the first branch line 70 opened by the first valve V1, thereby making it possible to efficiently cool the battery module B.

In the present exemplary embodiment, the second connection line 60 is connected to the battery cooling line 21 through a fourth valve V4 between the evaporator 46 and the battery module B connected to each other through the first branch line 70.

The fourth valve V4 selectively opens or closes the battery cooling line 21 connected to the battery module B, and selectively connects the second connection line 60 and the battery cooling line 21 to each other to supply the low-temperature coolant to the cooler 33.

In addition, a second branch line 80 connected to the cooling line 11 between the radiator 12 and the first water pump 14 through a fifth valve V5 may be provided on the cooling line 11 connecting between the electric component 15 and the radiator 12.

The second branch line 80 is selectively opened through an operation of the fifth valve V5 in the case of absorbing the waste heat generated in the electric component 15 and the battery module B to raise a temperature of the coolant. In this case, the cooling line 11 connected to the radiator 12 is closed through the operation of the fifth valve V5.

Meanwhile, a reservoir tank 19 connected to the second branch line 80 may be provided between the radiator 12 and the first water pump 14. The coolant introduced from the radiator 12 and cooled may be stored in the reservoir tank 19.

Here, the second and third valves may be a 4-way valve, the first, fourth and fifth valves may be a 3-way valve that may distribute a flow rate.

Figure 2:
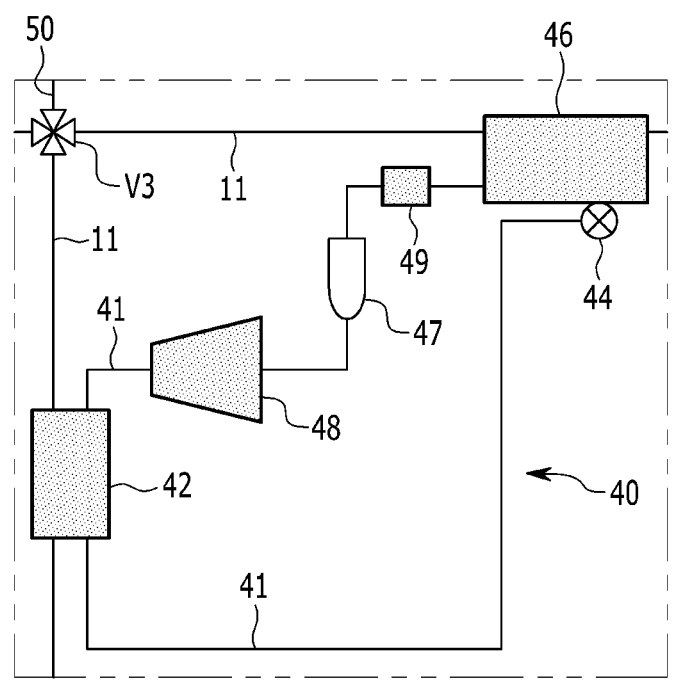
FIG. 2 is s schematic view illustrating another example of a CE module used in the heat pump system for a vehicle according to an exemplary embodiment of the present invention.

Meanwhile, in the present exemplary embodiment, the CE module 40 may further include an accumulator 47 instead of the receiver drier 43, as illustrated in FIG. 2.

FIG. 2 is s schematic view illustrating another example of a CE module used in the heat pump system for a vehicle according to an exemplary embodiment of the present invention.

Referring to FIG. 2, the accumulator 47 is provided on the refrigerant line 41 between the evaporator 46 and the compressor 48. The accumulator 47 supplies only a gaseous refrigerant to the compressor 48 to improve efficiency and durability of the compressor 48.

That is, in the CE module 40, the accumulator 47 may be removed in the case in which the receiver drier 43 is provided, and the accumulator 47 may be provided instead of the receiver drier 43 in the case in which the receiver drier 43 is not provided.

Meanwhile, although a case in which the refrigerant heater 49 is provided on the refrigerant line 21 has been described by way of example in the present exemplary embodiment, the present invention is not limited thereto. The refrigerant heater 49 may be selectively removed, if necessary.

Hereinafter, operations and actions, in each mode, of the heat pump system 1 for a vehicle according to an exemplary embodiment of the present invention configured as described above will be described in detail with reference to FIGS. 3 to 6.

First, an operation in the case of cooling the electric component 15 in the cooling mode of the vehicle will be described with reference to FIG. 3.

Figure 3:
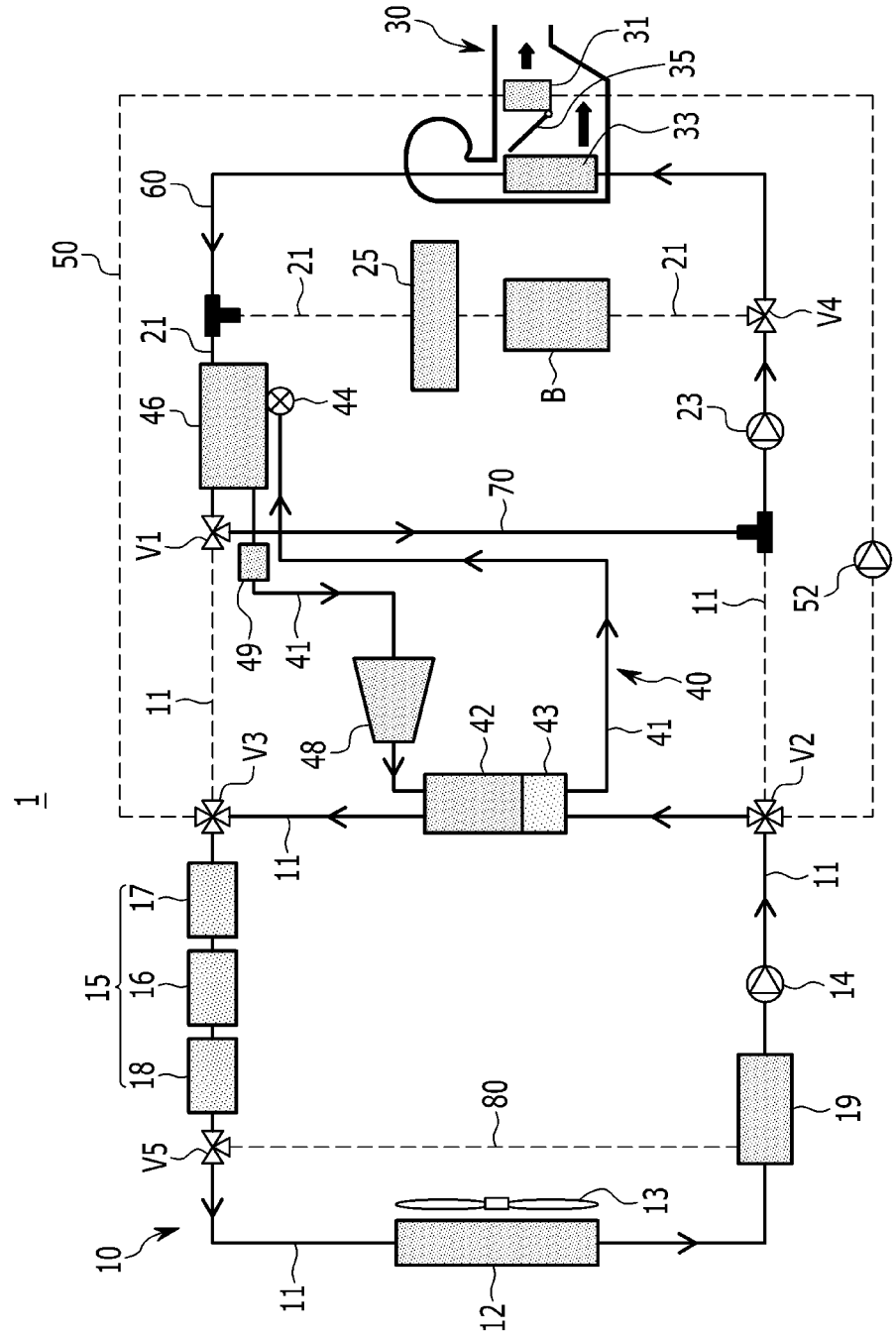
FIG. 3 is a view showing an operation state depending on a cooling mode of a vehicle in the heat pump system for a vehicle according to an exemplary embodiment of the present invention.

FIG. 3 is a view showing an operation state depending on a cooling mode of a vehicle in the heat pump system for a vehicle according to an exemplary embodiment of the present invention.

Referring to FIG. 3, the cooling system 10 is operated in order to cool the electric component 15. In addition, the respective components of the CE module 40 are operated in order to cool the interior of the vehicle, such that the refrigerant is circulated along the refrigerant line 41.

Here, the first branch line 70 is opened through an operation of the first valve V1.

The second connection line 60 is opened in a state in which the battery cooling line 21 connected to the battery module B is closed through an operation of the fourth valve V4.

In addition, the first connection line 50 is closed and the cooling line 11 connecting the electric component 15 and the condenser 42 is opened, through operations of the second and third valves V2 and V3.

Here, the connection between the cooling line 11 and the battery cooling line 21 is closed through operations of the first to third valves V1 to V3.

In addition, the second branch line 80 is closed through an operation of the fifth valve V5. At the same time, the fifth valve V5 opens the cooling line 11 connecting the electric component 15 and the radiator 12 to each other.

Therefore, the coolant cooled in the radiator 12 cools the electric component 15 while being circulated along the cooling lines 11 connected to each other by the second, third, and fifth valves V2, V3, and V5 through an operation of the first water pump 14.

In addition, the coolant of the battery cooling line 21 is circulated along the battery cooling line 21, the first branch line 70, and the second connection line 60 by an operation of the second water pump 23.

Here, the evaporator 46 exchanges heat between the coolant circulated along the battery cooling line 21 and a low-temperature refrigerant evaporated therein, and supplies a low-temperature coolant to the cooler 33.

That is, the refrigerant circulated along the refrigerant line 41 in the CE module 40 is condensed through heat-exchange with the coolant passing through the condenser 42, is expanded in the expansion valve 44, and is evaporated in the evaporator 46.

In this case, the refrigerant evaporated in the evaporator 46 cools the coolant introduced through the battery cooling line 21. In addition, the coolant cooled while passing through the evaporator 46 is supplied to the cooler 33 through the second connection line 60.

In this case, external air introduced into the HVAC module 30 is cooled while exchanging heat with the coolant that is introduced into the cooler 33 and is in a low-temperature state.

The opening or closing door 35 closes a portion through which the cooled external air passes into the internal heater 31 so that the cooled external air does not pass through the internal heater 31. Therefore, the cooled external air is directly introduced into the interior of the vehicle, thereby making it possible to cool the interior of the vehicle.

Meanwhile, in the case of cooing the battery module B together with the electric component 15 in the cooling mode of the vehicle, the battery cooling line 21 connected to the battery module B may be opened through the operation of the fourth valve V4.

In this case, the coolant cooled while passing through the evaporator 46 is circulated along the battery cooling line 21 connected to the battery module B and the second connection line 60. Therefore, the battery module B may be efficiently cooled by the low-temperature coolant supplied to the battery cooling line 21.

An operation of recovering the waste heat from the electric component and the battery module in the heating mode of the vehicle will be described with reference to FIG. 4.

Figure 4:
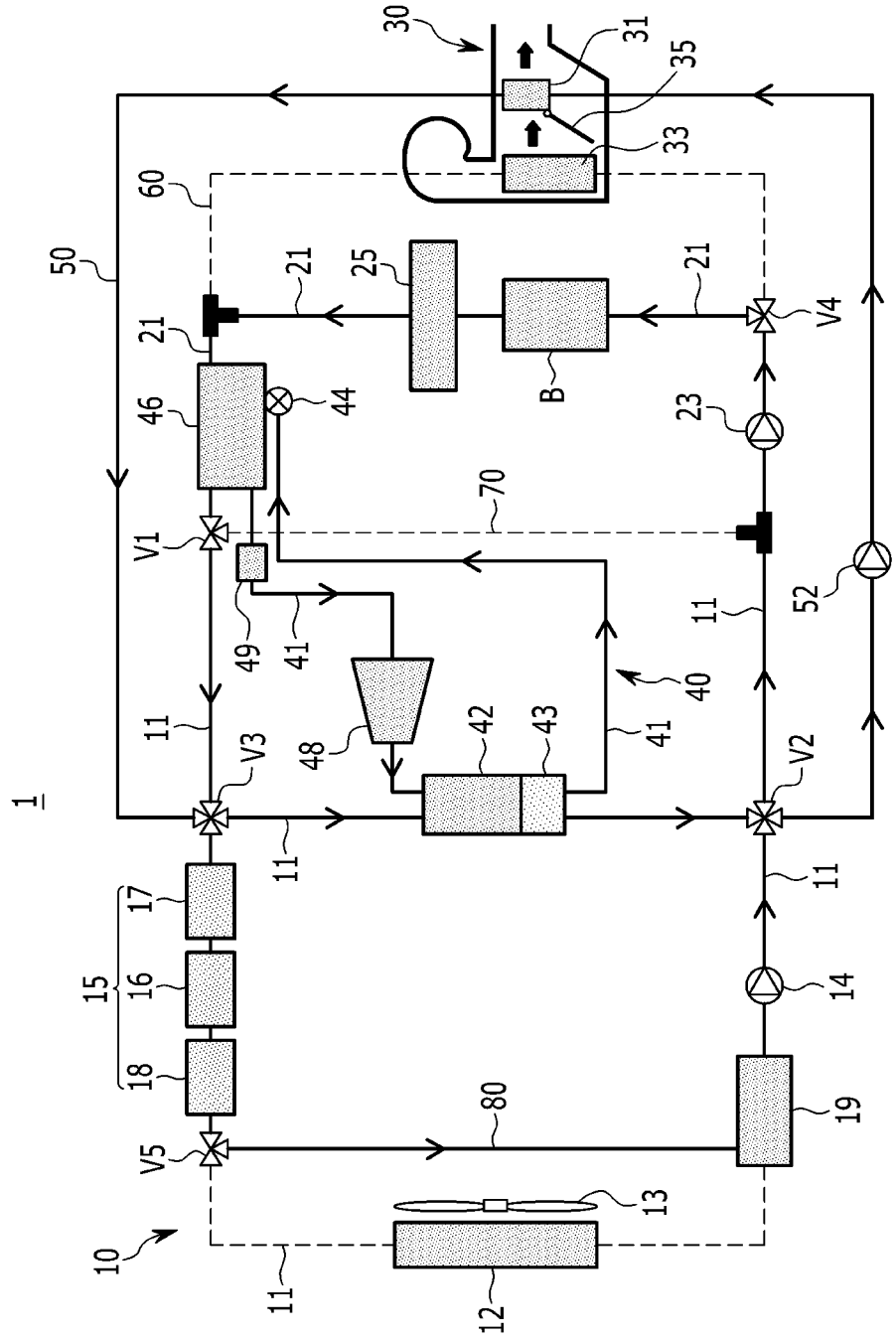
FIG. 4 is a view showing an operation state at the time of recovering waste heat from an electric component and a battery module in a heating mode of the vehicle in the heat pump system for a vehicle according to an exemplary embodiment of the present invention.

FIG. 4 is a view showing an operation state at the time of recovering waste heat from an electric component and a battery module in a heating mode of the vehicle in the heat pump system for a vehicle according to an exemplary embodiment of the present invention.

Referring to FIG. 4, in the case of recovering the waste heat of the electric component 15 and the battery module B in the heating mode of the vehicle, the respective components of the CE module 40 are operated in order to heat the interior of the vehicle, such that the refrigerant is circulated through the refrigerant line 41.

In this state, the first branch line 70 is closed through an operation of the first valve V1.

The battery cooling line 21 connected to the battery module B is opened through an operation of the fourth valve V4. The second connection line 60 is closed through the operation of the fourth valve V4.

The cooling line 11 connecting the electric component 15 and the condenser 42 and the first connection line 50 are opened through operations of the second and third valves V2 and V3.

In addition, the cooling line 11 is connected to the battery cooling line 21 through the operations of the first to third valves V1 to V3. The fifth valve V5 closes the cooling line 11 connecting the electric component 15 and the radiator 12 to each other in a state in which it opens the second branch line 80.

Therefore, the cooling line 11 and the battery cooling line 21 are connected to each other through selective operations of the first to fifth valves V1 to V5, and may form one closed circuit along which the coolant is circulated.

Here, the waste heat generated in the electric component 15 and the waste heat generated in the battery module B raise a temperature of the coolant circulated along the cooling line 11 and the battery cooling line 21.

The coolant of which the temperature is raised further raises a temperature of the refrigerant exhausted from the evaporator 46 while passing through the evaporator 46 through operations of the first and second water pumps 14 and 23.

The refrigerant of which the temperature is raised is introduced into the compressor 48, is compressed at a higher temperature and pressure in the compressor 48, and is then introduced into the condenser 42.

Here, the coolant is circulated along the cooling line 11 passing through the condenser 42 and the first connection line 50 connected to the cooling line 11 by the second and third valves V2 and V3 through an operation of the third water pump 52.

A temperature of the coolant passing through the condenser 42 may be further raised while the coolant exchanges heat with the refrigerant compressed at the higher temperature and pressure in the compressor 48 and then supplied to the condenser 42.

Therefore, the coolant of which the temperature is raised while passing through the condenser 42 is supplied to the internal heater 31.

Here, the opening or closing door 35 is opened so that the external air introduced into the HVAC module 30 and passing through the cooler 33 to which the supply of the coolant is stopped passes through the internal heater 31.

Therefore, the external air introduced from the outside is introduced in a room temperature state in which it is not cooled into the cooler 33 at the time of passing through the cooler 33. The introduced external air is changed in a high temperature state while passing through the internal heater 31 and is then introduced into the interior of the vehicle, such that heating of the interior of the vehicle may be implemented.

Meanwhile, the heater 25 may be selectively turned on, if necessary, to heat the coolant circulated along the battery cooling line 101. Therefore, the temperature of the refrigerant passing through the evaporator 46 may be rapidly raised.

That is, the heat pump system 1 for a vehicle according to the present exemplary embodiment uses waste heat sources generated in the electric component 15 and the battery module B to raise the temperature of the refrigerant in the heating mode of the vehicle, thereby making it possible to reduce power consumption of the compressor 48 and improve heating efficiency.

Meanwhile, in the case of recovering the waste heat from only the battery module B in the heating mode of the vehicle, the first branch line 70 is opened through the operation of the first valve V1. At the same time, the connection between the cooling line 11 and the battery cooling line 21 is closed through the operations of the first to third valves V1 to V3.

In this case, the coolant recovers the waste heat generated in the battery module B while being circulated along the battery cooling line 21 and the first branch line 70 through an operation of the second water pump 23, such that a temperature of the coolant is raised. The coolant of which the temperature is raised may raise a temperature of the refrigerant through heat-exchange with the refrigerant while passing through the evaporator 46.

That is, although a case in which both of the waste heat of the electric component 15 and the waste heat of the battery module B are recovered or the waste heat of the battery module B is recovered in the heating mode of the vehicle has been described by way of example in the present exemplary embodiment, the present invention is not limited thereto. That is, the waste heat generated in the electric component 15 except for the waste heat of the battery module B may also be recovered.

In the present exemplary embodiment, an operation in the heating and dehumidifying mode of the vehicle will be described with reference to FIG. 5.

Figure 5:
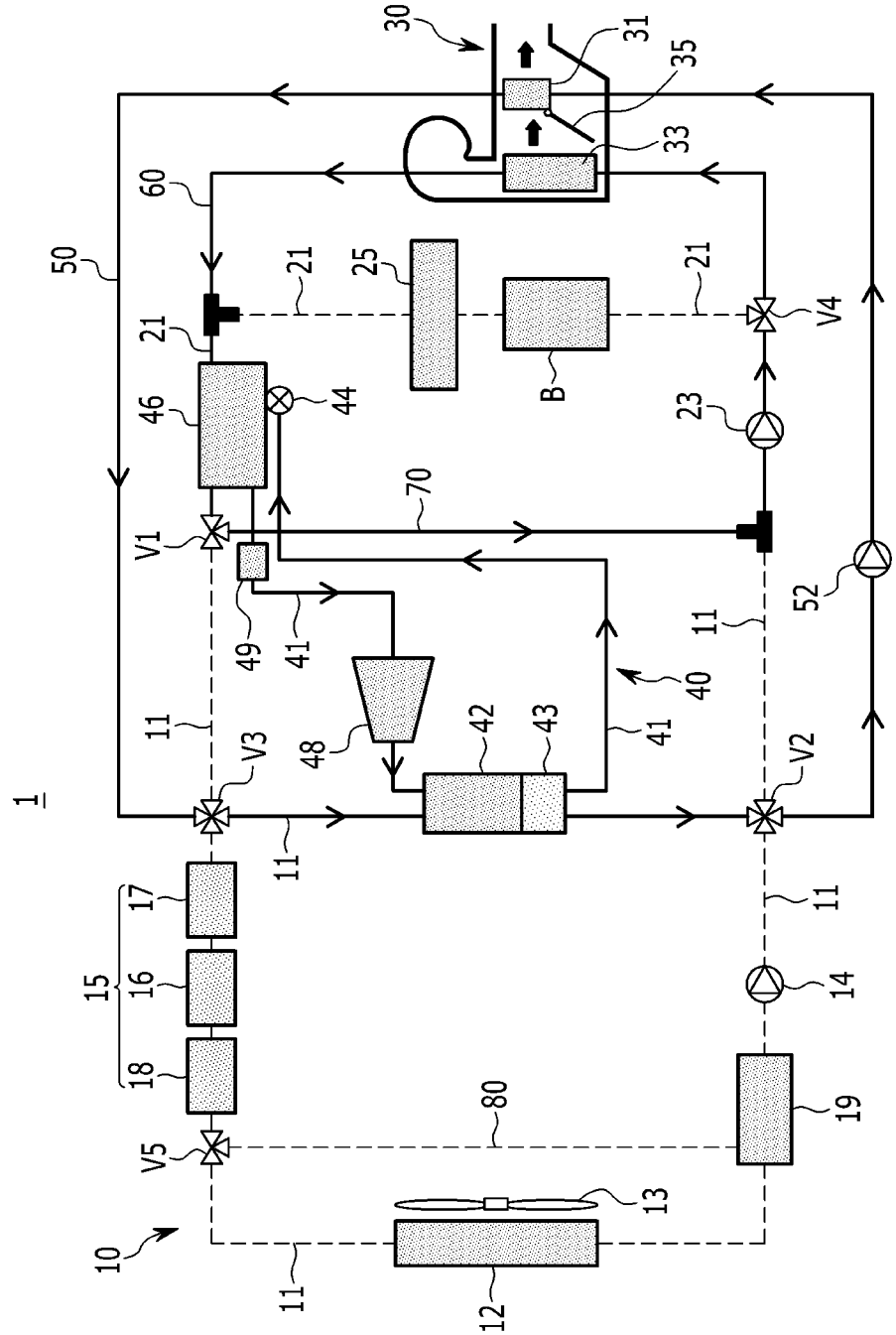
FIG. 5 is a view showing an operation state depending on a heating and dehumidifying mode of the vehicle in the heat pump system for a vehicle according to an exemplary embodiment of the present invention.

FIG. 5 is a view showing an operation state depending on a heating and dehumidifying mode of the vehicle in the heat pump system for a vehicle according to an exemplary embodiment of the present invention.

Referring to FIG. 5, in the heating and dehumidifying mode of the vehicle, the respective components of the CE module 40 are operated in order to heat the interior of the vehicle, such that the refrigerant is circulated along the refrigerant line 41.

The first branch line 70 is opened through an operation of the first valve V1. The battery cooling line 21 connected to the battery module B is closed through an operation of the fourth valve V4. At the same time, the second connection line 60 is opened by the fourth valve V4, such that the first branch line 70 and the second connection line 60 are connected to each other.

The cooling line 21 connecting the electric component 15 and the condenser 42 and the first connection line 50 are opened and are connected to each other through operations of the second and third valves V2 and V3.

In addition, the connection between the cooling line 11 and the battery cooling line 21 is closed through the operations of the first to third valves V1 to V3 in a state in which an operation of the first water pump 14 is stopped.

Therefore, the coolant is circulated along the cooling line 11 passing through the condenser 42 and the first connection line 50 connected to the cooling line 11 by the second and third valves V2 and V3 through an operation of the third water pump 52.

Here, a temperature of the coolant passing through the condenser 42 is raised while the coolant exchanges heat with the refrigerant exhausted from the compressor 48, compressed in a high-temperature and high-pressure state in the compressor 48, and supplied to the condenser 42. Then, the coolant of which the temperature is raised is supplied to the internal heater 31.

Meanwhile, the coolant of the battery cooling line 21 is circulated along the battery cooling line 21, the first branch line 70, and the second connection line 60 by an operation of the second water pump 23.

Here, the evaporator 46 exchanges heat between the coolant circulated along the battery cooling line 21 and a low-temperature refrigerant evaporated therein, and supplies a low-temperature coolant to the cooler 33.

In this case, the refrigerant evaporated in the evaporator 46 cools the coolant introduced through the battery cooling line 21. In addition, the coolant cooled while passing through the evaporator 46 is supplied to the cooler 33 through the second connection line 60.

Therefore, the external air introduced into the HVAC module 30 is dehumidified while passing through the cooler 33 into which the low-temperature coolant is introduced. Then, the external air is changed into a high-temperature state while passing through the internal heater 31 to which the high-temperature coolant is supplied and is then introduced into the interior of the vehicle, thereby heating and dehumidifying the interior of the vehicle.

In addition, an operation at the time of raising a temperature of the battery module B will be described with reference to FIG. 6.

Figure 6:
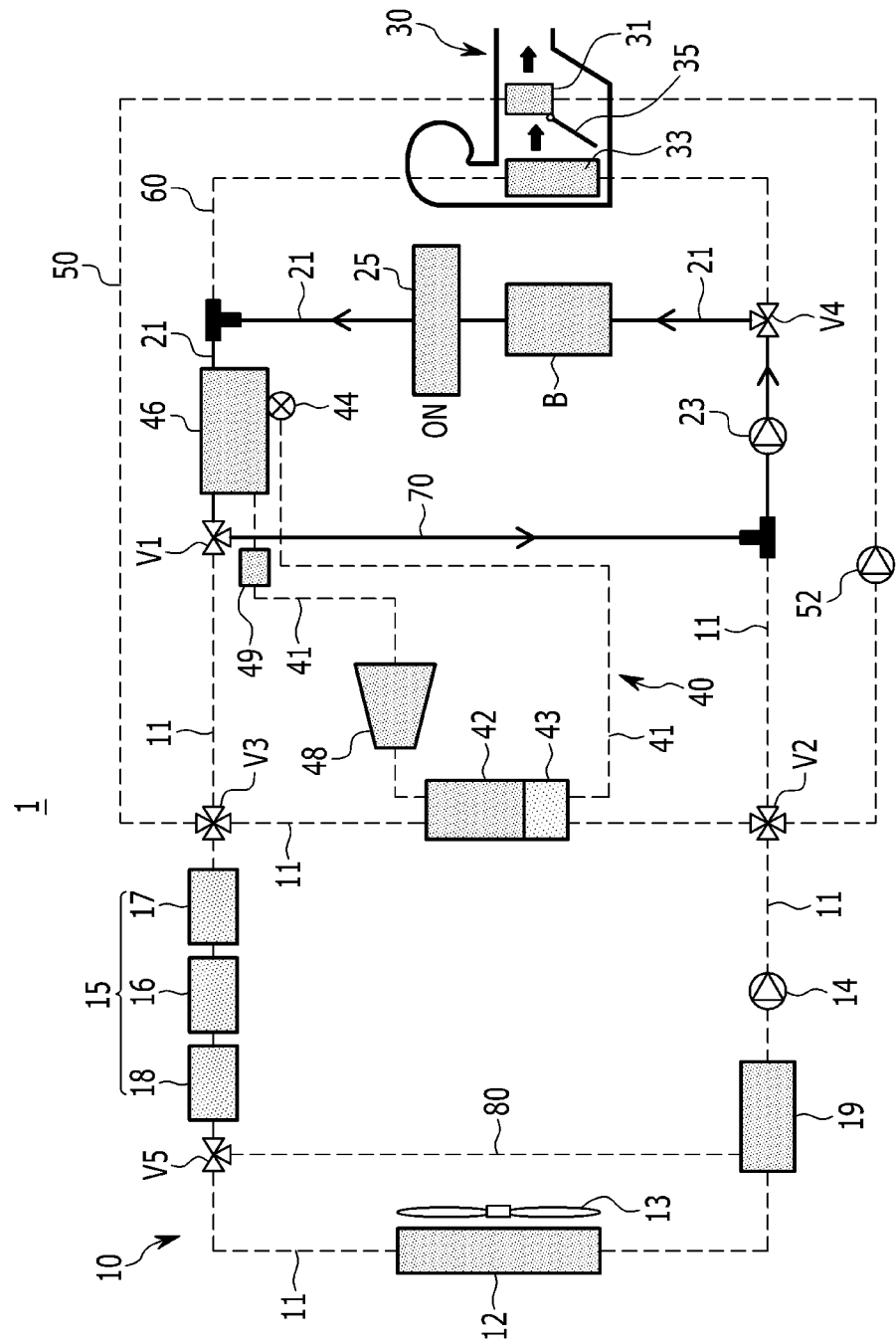
FIG. 6 is a view showing an operation state at the time of raising a temperature of the battery module in the heat pump system for a vehicle according to an exemplary embodiment of the present invention.

FIG. 6 is a view showing an operation state at the time of raising a temperature of the battery module in the heat pump system for a vehicle according to an exemplary embodiment of the present invention.

Referring to FIG. 6, in the case of raising the temperature of the battery module B, an operation of the CE module 40 is stopped, such that the circulation of the refrigerant is stopped.

In addition, the first branch line 70 is connected to the battery cooling line 21 through an operation of the first valve V1. In addition, the connection between the battery cooling line 21 and the cooling line 11 is closed through the operation of the first valve V1.

Therefore, the battery cooling line 21 and the first battery branch line 70 form one closed circuit. In this case, the coolant passes through the battery module B while being circulated along the battery cooling line 21 and the first branch line 70 through an operation of the second water pump 23

In this case, the heater 25 is turned on to heat the coolant circulated along the battery cooling line 21 and then introduces the heated coolant into the battery module B, thereby making it possible to rapidly raise a temperature of the battery module B.

Therefore, when the heat pump system 1 for a vehicle according to an exemplary embodiment of the present invention configured as described above is applied, the thermal energy generated from the refrigerant at the time of condensing and evaporating the refrigerant is selectively exchanged with the heat of the coolant, and an interior temperature of the vehicle is controlled using the low-temperature or high-temperature coolant of which the heat is exchanged, thereby making it possible to simplify the heat pump system for a vehicle and simplify a layout of connection pipes through which the refrigerant is circulated.

In addition, the heat pump system 1 for a vehicle may improve heating efficiency of the vehicle using the waste heat of the electric component 15 and the battery module B, and may increase an entire travel distance of the vehicle by efficiently controlling the temperature of the battery module B so that the battery module B exhibits optimal performance.

In addition, the CE module 40 generating the thermal energy through the condensation and evaporation of the refrigerant is packaged, and the high-performance R152-a or R744 refrigerant is used, such that a size and a weight may be reduced, and generation of noise, vibrations, and operation instability may be prevented as compared with an air conditioner according to the related art.

Further, the entire heat pump system for a vehicle is simplified, thereby making it possible to reduce a cost required for manufacturing the heat pump system for a vehicle and a weight of the heat pump system for a vehicle and improve space utilization.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A heat pump system for a vehicle, comprising:
   a cooling system including a radiator connected to a cooling line and a first water pump, the cooling system configured to circulate a coolant along the cooling line so as to cool an electric component;
   a battery module provided on a battery cooling line selectively connected to the cooling line through a first valve;
   a heating, ventilation, and air conditioning (HVAC) module including an internal heater connected to the cooling line through a first connection line, a cooler connected to the battery cooling line through a second connection line, and an opening or closing door provided between the internal heater and the cooler and configured to control external air passing through the cooler to be selectively introduced into the internal heater depending on cooling, heating, and heating and dehumidifying modes of the vehicle;

a second valve provided on the cooling line between the radiator and the battery module;

a third valve provided on the cooling line between the electric component and the first valve; and a centralized energy (CE) module connected to each of the battery cooling line and the cooling line, the CE module configured to exchange thermal energy generated when condensing and evaporating a refrigerant circulated therein with heat of the coolant, and to supply a low-temperature or high-temperature coolant of which the heat is exchanged to the HVAC module, wherein the CE module comprises:

a condenser provided on the cooling line between the second valve and the third valve;

an expansion valve connected to the condenser through a refrigerant line;

an evaporator connected to the expansion valve through the refrigerant line and provided on the battery cooling line between the battery module and the first valve; and a compressor provided on the refrigerant line between the evaporator and the condenser;

wherein a first branch line connecting the evaporator and the battery module to each other through the first valve is provided on the battery cooling line;

wherein the second connection line is connected to the battery cooling line through a fourth valve between the evaporator and the battery module connected to each other through the first branch line;

wherein a second branch line connected to the cooling line between the radiator and the first water pump through a fifth valve is provided on the cooling line connecting between the electric component and the radiator; and wherein the heat pump system further comprises a reservoir tank connected to the second branch line between the radiator and the first water pump.

2. The heat pump system of claim 1, wherein:
the first valve connects the cooling line connected to the electric component and the battery cooling line to each other between the radiator and the evaporator; and
the first connection line selectively connects the cooling line and the internal heater to each other through the second valve and the third valve.

3. The heat pump system of claim 1, wherein, in the case of cooling the electric component in a cooling mode of the vehicle, the heat pump system is configured to operate so that:
the first branch line is opened through an operation of the first valve and the second connection line is opened in a state in which the battery cooling line connected to the battery module is closed through an operation of the fourth valve;
the first connection line is closed and the cooling line connecting the electric component and the condenser to each other is opened, through operations of the second and third valves;
the connection between the cooling line and the battery cooling line is closed through operations of the first to third valves;

the cooling line connecting the electric component and the radiator to each other is opened in a state in which the second branch line is closed through an operation of the fifth valve; and
the refrigerant is circulated in the CE module.

4. The heat pump system of claim 3, wherein the evaporator is configured, in the cooling mode of the vehicle, to exchange heat between a coolant circulated along the battery cooling line and the low-temperature refrigerant evaporated therein and to supply the low-temperature coolant to the cooler.

5. The heat pump system claim 3, wherein, in the case of cooling the battery module together with the electric component in the cooling mode of the vehicle, the heat pump system is configured to operate so that the battery cooling line connected to the battery module is opened through an operation of the fourth valve.

6. The heat pump system of claim 1, wherein, in the case of recovering waste heat of the battery module and the electric component in a heating mode of the vehicle, the heat pump system is configured to operate so that:
the first branch line is closed through an operation of the first valve and the second connection line is closed in a state in which the battery cooling line connected to the battery module is opened through an operation of the fourth valve;
the cooling line connecting the electric component and the condenser to each other and the first connection line are opened through operations of the second and third valves;
the cooling line is connected to the battery cooling line through operations of the first to third valves;
the cooling line connecting the electric component and the radiator to each other is closed in a state in which the second branch line is opened through an operation of the fifth valve; and
the refrigerant is circulated in the CE module.

7. The heat pump system of claim 6, wherein the heat pump system is configured to operate so that waste heat generated in the electric component and the battery module raises a temperature of a coolant circulated along the cooling line and the battery cooling line, and the coolant of which the temperature is raised raises a temperature of the refrigerant exhausted from the evaporator.

8. The heat pump system of claim 6, wherein, in the case of recovering the waste heat from only the battery module in the heating mode of the vehicle, the heat pump system is configured to operate so that the first branch line is opened through an operation of the first valve, and the connection between the cooling line and the battery cooling line is closed through operations of the first to third valves.

9. The heat pump system of claim 1, wherein, in the heating and dehumidifying mode of the vehicle, the heat pump system is configured to operate so that:
the first branch line is opened through an operation of the first valve and the second connection line is opened in a state in which the battery cooling line connected to the battery module is closed through an operation of the fourth valve;
the cooling line connecting the electric component and the condenser to each other and the first connection line are opened through operations of the second and third valves;
the connection between the cooling line and the battery cooling line is closed through operations of the first to third valves in a state in which an operation of the first water pump is stopped; and the refrigerant is circulated in the CE module.

10. The heat pump system of claim 1, further comprising a heater provided on the battery cooling line between the battery module and the evaporator, wherein the heater is configured to be selectively turned on to heat the coolant circulated along the battery cooling line and to introduce the heated coolant into the battery module.

11. The heat pump system of claim 10, wherein, in the case of raising a temperature of the battery module, the heat pump system is configured to operate so that circulation of the refrigerant in the CE module is stopped, and the first branch line is connected to the battery cooling line and the connection between the battery cooling line and the cooling line is closed, through an operation of the first valve.

12. The heat pump system of claim 1, wherein the condenser and the evaporator are formed of a water cooling type heat exchanger into which the coolant is introduced through the cooling line and the battery cooling line.

13. The heat pump system of claim 1, wherein the condenser further comprises a receiver drier, the heat pump system further comprising a refrigerant heater provided on the refrigerant line between the compressor and the evaporator.

14. The heat pump system of claim 1, further comprising an accumulator and a refrigerant heater provided the refrigerant line between the compressor and the evaporator.

15. The heat pump system of claim 1, further comprising:
a second water pump provided on the battery cooling line; and
a third water pump provided on the first connection line.

16. The heat pump system of claim 1, wherein the refrigerant circulated in the CE module is an R152-a or R744 refrigerant.

17. The heat pump system of claim 1, wherein:
the electric component includes a motor, an electric power control unit, and an on-board charger; and
during operation the motor and the electric power control unit generate heat while being driven, and the on-board charger generates heat when charging the battery module.

18. The heat pump system of claim 1, wherein the reservoir tank is connected within the cooling line between the radiator and the first water pump, the reservoir tank being further connected to the second branch line.

19. The heat pump system of claim 18, wherein the reservoir tank is connected between the radiator and the first water pump without any intervening valves.

* * * * *